(12) United States Patent
Wang et al.

(10) Patent No.: US 12,393,038 B2
(45) Date of Patent: Aug. 19, 2025

(54) SUPPORT FOR HEAD-MOUNTABLE DEVICE

(71) Applicant: Apple Inc., Cupertino, CA (US)

(72) Inventors: Paul X. Wang, Cupertino, CA (US); Scott M. Leinweber, Sunnyvale, CA (US); Adam Y. Kollgaard, Santa Clara, CA (US); Venkata Narayana Murthy Arelekatti, Palo Alto, CA (US); Sally R. Annis, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/409,696

(22) Filed: Jan. 10, 2024

(65) Prior Publication Data

US 2024/0142783 A1 May 2, 2024

Related U.S. Application Data

(63) Continuation of application No. 17/384,611, filed on Jul. 23, 2021, now Pat. No. 11,906,748.

(60) Provisional application No. 63/073,384, filed on Sep. 1, 2020.

(51) Int. Cl.
*G02B 27/01* (2006.01)
(52) U.S. Cl.
CPC ............... *G02B 27/0176* (2013.01)

(58) Field of Classification Search
CPC .................................................. G02B 27/0176
See application file for complete search history.

(56) References Cited

U.S. PATENT DOCUMENTS

| 9,195,067 | B1 | 11/2015 | Heinrich |
| 9,897,812 | B2 | 2/2018 | Miller et al. |
| 11,156,842 | B2 | 10/2021 | Ellis et al. |
| 2010/0245757 | A1 | 9/2010 | Sugihara |
| 2011/0273365 | A1* | 11/2011 | West .................. G02B 27/0179 29/428 |
| 2012/0068921 | A1 | 3/2012 | Jacobsen |
| 2018/0011327 | A1* | 1/2018 | Perlin ................ G02B 27/0176 |
| 2018/0180894 | A1* | 6/2018 | Pombo ............... G02B 27/0176 |
| 2019/0171023 | A1* | 6/2019 | Carlvik .............. G02B 27/0176 |
| 2020/0278556 | A1 | 9/2020 | Chae et al. |
| 2020/0397109 | A1 | 12/2020 | Haines |
| 2023/0049355 | A1 | 2/2023 | Lee |

* cited by examiner

*Primary Examiner* — Sahlu Okebato
(74) *Attorney, Agent, or Firm* — BAKERHOSTETLER

(57) ABSTRACT

Systems of the present disclosure can provide a head-mountable device that distributes forces along the user's head. A head-mountable device can include head securement element with a support element to engage the head of the user. The support element can be coupled to the frame or light seal module of the head-mountable device. The support element can be attachable or deployable from the head-mountable device. A head-mountable device can also distribute forces with a support portion extending from a band.

20 Claims, 14 Drawing Sheets

SUPPORT FOR HEAD-MOUNTABLE DEVICE

CROSS-REFERENCE TO RELATED APPLICATIONS

This application is a continuation of U.S. Non-Provisional application Ser. No. 17/384,611, entitled "SUPPORT FOR HEAD-MOUNTABLE DEVICE," filed Jul. 23, 2021, which claims the benefit of U.S. Provisional Application No. 63/073,384, entitled "SUPPORT FOR HEAD-MOUNTABLE DEVICE," filed Sep. 1, 2020, the entirety of which are incorporated herein by reference.

TECHNICAL FIELD

The present description relates generally to head-mountable devices, and, more particularly, to mechanisms for supporting and securing a head-mountable devices to a head of a user.

BACKGROUND

A head-mountable device can be worn by a user to display visual information within the field of view of the user. The head-mountable device can be used as a virtual reality (VR) system, an augmented reality (AR) system, and/or a mixed reality (MR) system. A user may observe outputs provided by the head-mountable device, such as visual information provided on a display. The display can optionally allow a user to observe an environment outside of the head-mountable device. Other outputs provided by the head-mountable device can include speaker output and/or haptic feedback. A user may further interact with the head-mountable device by providing inputs for processing by one or more components of the head-mountable device. For example, the user can provide tactile inputs, voice commands, and other inputs while the device is mounted to the user's head.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
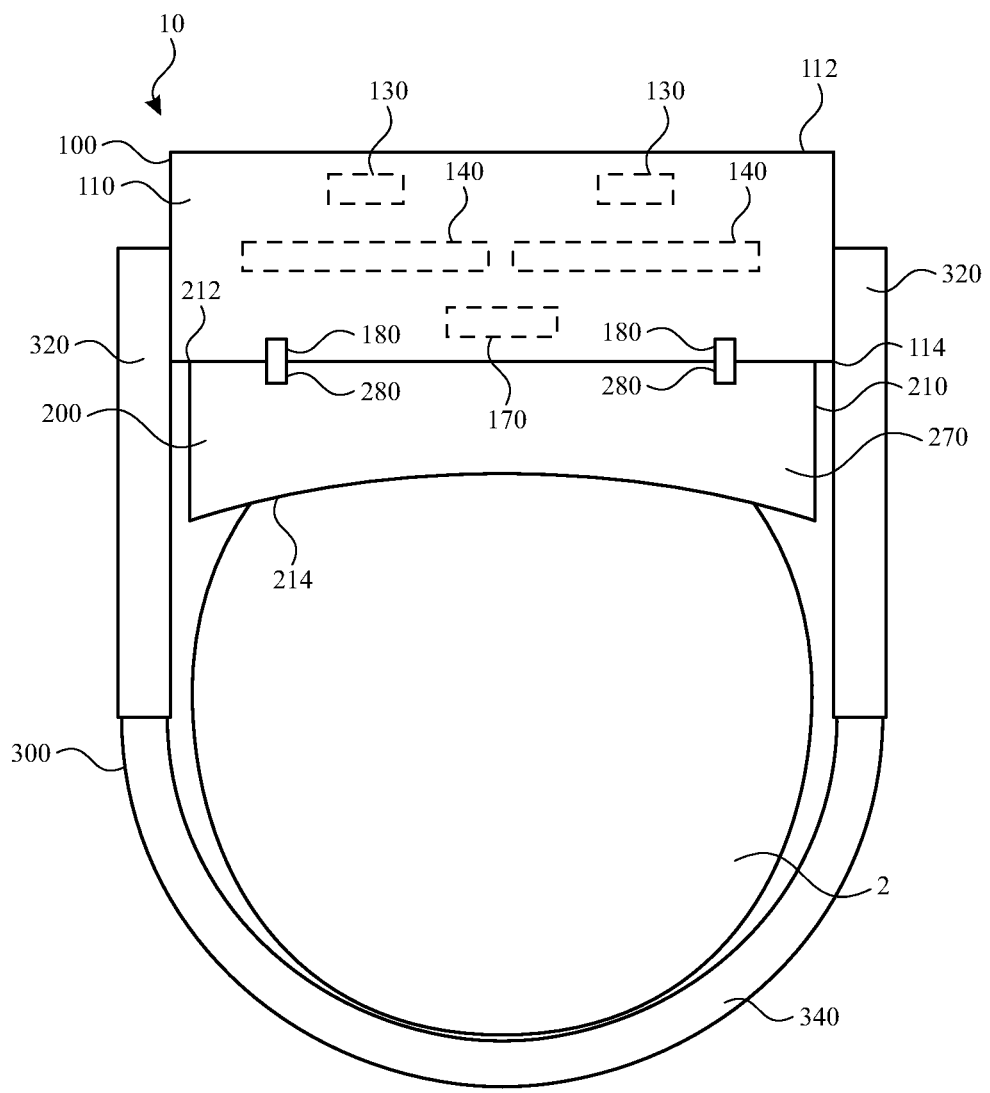
FIG. 1 illustrates a top view of a head-mountable device, according to some embodiments of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Head-mountable devices, such as head-mountable displays, headsets, visors, smartglasses, head-up display, etc., can perform a range of functions that are managed by the components (e.g., sensors, circuitry, and other hardware) included with the wearable device.

A head-mountable device can be secured to a head of a user while being worn and used by the user. It can be desirable to maximize the fit and comfort on the user, so that usage of the head-mountable device for extended durations is not difficult for the user.

Some head-mountable devices are designed to secure to the head of the user by wrapping tightly around the back of the user's head, for example, with a band. This arrangement often focuses forces on the front and rear of the user's head. This can be uncomfortable for the user and restrict the movement of the user's face, for example when making natural facial expressions.

In some applications, a user may wear a head-mountable device for a relatively short period of time. During a short period of time, a user may not experience discomfort from wearing the head-mountable device. However, in some applications, a user may wear a head-mountable device for a longer or extended period of time. During extended wear of a head-mountable device, the user may experience discomfort due to prolonged and/or focused forces on the user's head.

It can be desirable to evenly distribute forces across a wide area of the user's head during extended wear of a head-mounted device. For example, systems of the present disclosure can provide a head-mountable device that distributes securement forces along a user's head. A head-mountable device can include a support element that distributes forces along a forehead of the user. The support element can be attachable or deployable for extended wear of the head-mounted device. A head-mountable device can also distribute forces (e.g. weight) around the band of the head-mountable device. A support portion of the band can extend to provide additional surface area, increase the surface area of the band, or can include secondary support bands to distribute forces of the head-mountable device.

These and other embodiments are discussed below with reference to FIGS. 1-26. However, those skilled in the art will readily appreciate that the detailed description given herein with respect to these Figures is for explanatory purposes only and should not be construed as limiting.

According to some embodiments, for example as shown in FIG. 1, a head-mountable device 10 includes an HMD module 100 and a light seal module 200. The HMD module 100 includes a frame 110 that is worn on a head of a user. The frame 110 can be positioned in front of the eyes of a user to provide information within a field of view of the user. The HMD module 100 and/or the light seal module 200 can provide a nosepiece to rest on a user's nose.

The frame 110 can provide structure around a peripheral region thereof to support any internal components of the frame 110 in their assembled position. For example, the frame 110 can enclose and support various internal components (including for example integrated circuit chips, processors, memory devices and other circuitry) to provide computing and functional operations for the head-mountable device 10, as discussed further herein. While several components are shown within the frame 110, it will be understood that some or all of these components can be located anywhere within or on the head-mountable device 10. For example, one or more of these components can be positioned within the light seal module 200 and/or a head securement element 300 of the head-mountable device 10.

The frame 110 can include and/or support one or more camera modules 130. The camera modules 130 can be positioned on or near an outer side 112 of the frame 110 to capture images of views external to the head-mountable device 10. As used herein, an outer side of a portion of a head-mountable device is a side that faces away from the user and/or towards an external environment. The captured images can be used for display to the user or stored for any other purpose. Each of the camera modules 130 can be movable along the outer side 112. For example, a track or other guide can be provided for facilitating movement of the camera module 130 therein.

The head-mountable device 10 can include display elements 140 that provide visual output for viewing by a user wearing the head-mountable device 10. One or more display elements 140 can be positioned on or near an inner side 114 of the frame 110. As used herein, an inner side 114 of a portion of a head-mountable device is a side that faces toward the user and/or away from the external environment.

A display element 140 can transmit light from a physical environment (e.g., as captured by a camera module) for viewing by the user. Such a display element 140 can include optical properties, such as lenses for vision correction based on incoming light from the physical environment. Additionally or alternatively, a display element 140 can provide information as a display within a field of view of the user. Such information can be provided to the exclusion of a view of a physical environment or in addition to (e.g., overlaid with) a physical environment.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations, (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Each display element 140 can be adjusted to align with a corresponding eye of the user. For example, each display element 140 can be moved along one or more axes until a center of each display element 140 is aligned with a center of the corresponding eye. Accordingly, the distance between the display elements 140 can be set based on an interpupillary distance ("IPD") of the user. IPD is defined as the distance between the centers of the pupils of a user's eyes.

The pair of display elements 140 can be mounted to the frame 110 and separated by a distance. The distance between the pair of display elements 140 can be designed to correspond to the IPD of a user. The distance can be adjustable to account for different IPDs of different users that may wear the head-mountable device 10. For example, either or both of the display elements 140 may be movably mounted to the frame 110 to permit the display elements 140 to move or translate laterally to make the distance larger or smaller. Any type of manual or automatic mechanism may be used to permit the distance between the display elements 140 to be an adjustable distance. For example, the display elements 140 can be mounted to the frame 110 via slidable tracks or guides that permit manual or electronically actuated movement of one or more of the display elements 140 to adjust the distance there between.

Additionally or alternatively, the display elements 140 can be moved to a target location based on a desired visual effect that corresponds to user's perception of the display element 140 when it is positioned at the target location. The target location can be determined based on a focal length of the user and/or optical elements of the system. For example, the user's eye and/or optical elements of the system can determine how the visual output of the display element 140 will be perceived by the user. The distance between the display element 140 and the user's eye and/or the distance between the display element 140 and one or more optical elements can be altered to place the display element 140 at, within, or outside of a corresponding focal distance. Such adjustments can be useful to accommodate a particular user's eye, corrective lenses, and/or a desired optical effect.

As shown in FIG. 1, the light seal module 200 can include a chassis that provides structural support to one or more other components of the light seal module 200. The chassis 210, or portions thereof, can extend to, from, and/or between the inner side 214 and the outer side 212. The chassis 210 can support a cover 270 that extends at least partially from the outer side 212 to the inner side 214. The chassis and/or the cover 270 can define an interior space through which light can pass, thereby providing to the user wearing the head-mountable device a view of a display element of the HMD module 100. Such a view can be enhanced by preventing the ingress of light from the external environment and into the light seal module 200.

As further shown in FIG. 1, attachment elements can facilitate coupling of the HMD module 100 to the light seal module 200 in a relative position and orientation that aligns the display elements 140 of the HMD module 100 in a preferred position and orientation for viewing by the user. The HMD module 100 and the light seal module 200 can be coupled to prevent ingress of light from an external environment. For example, HMD module attachment elements 180 can releasably engage light seal module attachment elements 280. One or more of various mechanisms can be provided to secure the modules to each other. For example, mechanisms such as locks, latches, snaps, screws, clasps, threads, magnets, pins, an interference (e.g., friction) fit, knurl presses, bayoneting, and/or combinations thereof can be included to couple and/or secure the HMD module 100 and the light seal module 200 together. The modules can remain secured to each other until an optional release mechanism is actuated. The release mechanism can be provided on an outer surface of the head-mountable device 10 for access by a user.

While the light seal module 200 is shown schematically with a particular size and shape, it will be understood that the size and shape of the light seal module 200, particularly at the inner side 214 of the light seal module 200, can have a size and shape that accommodates the face of a user wearing the head-mountable device 10. For example, the inner side 214 can provide a shape that generally matches the contours of the user's face around the eyes of the user. The inner side 214 can be provided with one or more features that allow the light seal module 200 to conform to the face of the user to enhance comfort and block light from entering the light sealed module 200 at the point of contact with the face. For example, the inner side 214 can provide a flexible, soft, elastic, and/or compliant structure. As can be appreciated, the light seal module 200 can conform to the face of the user to enhance comfort or otherwise support the head-mountable device 10 without necessarily blocking light from entering the light seal module 200 at the point of contact with the face.

The HMD module 100 and/or the light seal module 200 can include a sensor 170. The sensor 170 can be positioned and arranged to detect a characteristic of the user, such as facial features. For example, such a user sensor can perform facial feature detection, facial movement detection, facial recognition, eye tracking, user mood detection, user emotion detection, voice detection, and the like. The head-mountable device 10 can facilitate such detections by reducing the load (e.g., weight) on the user's and distributing forces to other regions of the user's head, such as the top, rear, and/or sides of the user's head, as discussed further herein.

The HMD module 100 and/or the light seal module 200 can be supported on a user's head 2 with a head securement element 300. The head securement element 300 can wrap or extend along opposing sides of a user's head 2 and/or to a rear of the user's head 2. It will be appreciated that other configurations can be applied for securing the head-mountable device 10 to a user's head. For example, one or more bands, straps, belts, caps, hats, or other components can be used in addition to or in place of the illustrated components of the head-mountable device 10.

As shown in FIG. 1, the head securement element 300 can include arms 320 on opposing sides. Each of the arms 320 can be coupled to the HMD module 100 of the head-mountable device 10. The arms 320 can provide a substantially rigid structure for support.

The head securement element 300 can further include a strap 340 for extending to and/or about a rear side of the head 2 of the user. The strap 340 can optionally extend from ends of the arms 320. The strap 340 can be stretchable to comfortably provide tension about the head of the user.

Figure 2:
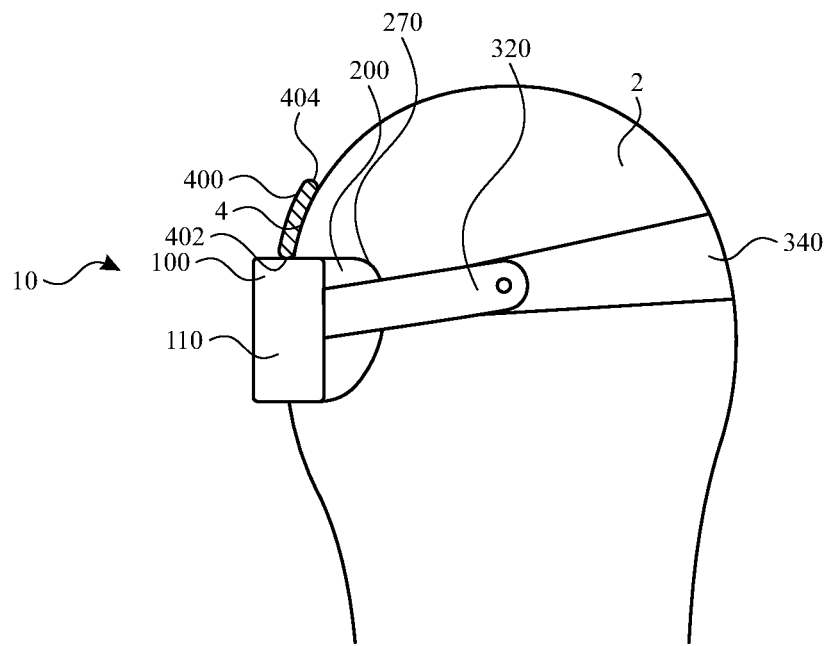
FIG. 2 illustrates a side view of a head-mountable device, according to some embodiments of the present disclosure.
Figure 3:
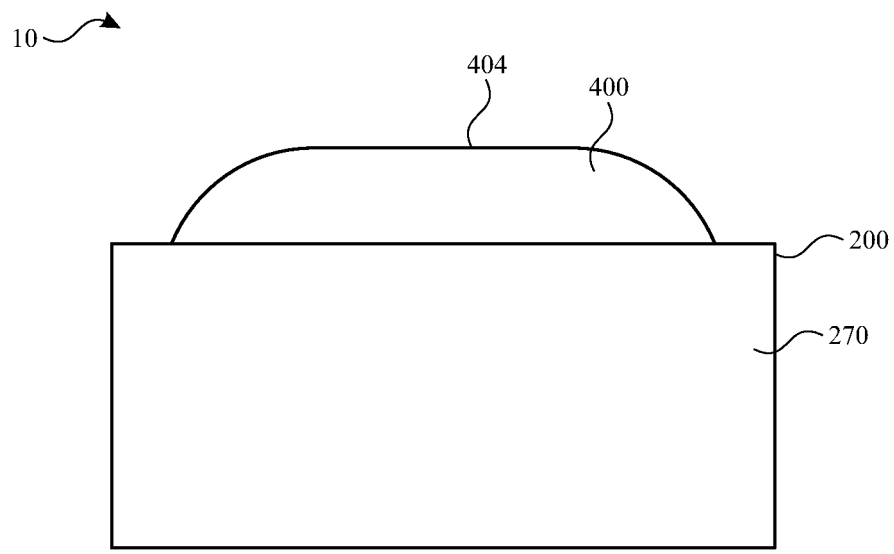
FIG. 3 illustrates a rear view of the head-mountable device of FIG. 2, according to some embodiments of the present disclosure.
Figure 4:
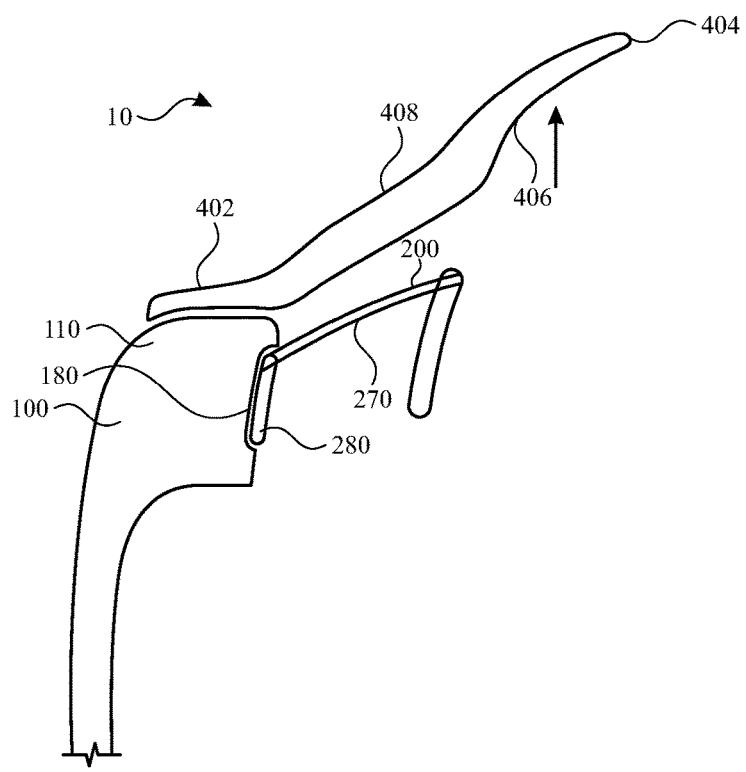
FIG. 4 illustrates a partial cross-sectional side view of a head-mountable device, according to some embodiments of the present disclosure.

Referring to FIGS. 2-4, the head-mountable device 10 can include a support element 400 to distribute the forces imparted on the user while wearing the head-mountable device 10. The support element 400 can supplement the contact area of the head securement element 300 to distribute the forces imparted on the user by the head-mountable device 10 over a greater area of the user's head 2. By increasing the contact area of the head-mountable device 10 the pressure exerted on any portion of the user's head 2 can be reduced, increasing comfort for short-term and long-term wear of the head-mountable device.

In some embodiments, the support element 400 can engage with features of the user's head 2 to further distribute forces of the head-mountable device 10. Advantageously, the support element 400 can allow forces to be distributed to various portions of the user's head 2 to relieve other portions of the user's head 2 that may be fatigued.

In the depicted example, the support element 400 extends upward from the HMD module 100 to engage the user's forehead. By engaging the user's forehead, the support element 400 can distribute or transfer forces between the support element 400 and a greater portion of the user's forehead or head 2, increasing comfort. An upper portion 404 of the support element 400 can extend upwardly a desired height from the HMD module 100. As can be appreciated, and as described herein, the support element 400 can engage other features or regions of the users head 2. In some embodiments, the support element 400 can extend along an upper portion or edge of the HMD module 100. As illustrated, the support element 400 can extend along a portion of the upper portion or edge of the HMD module 100. Optionally, the support element 400 can extend along the entire length of the upper portion or edge of the HMD module 100.

Optionally, the support element 400 can be formed from a conforming material to conform to a user's features. In some embodiments, the support element 400 can include raised surfaces that penetrate hair of the user and engage the underlying skin. The raised surfaces can be formed as peaks, undulations, geometric shapes, and the like. The raised surfaces can be monolithic with the support element 400.

As illustrated, the support element 400 can be coupled with portions of the head-mountable device 10. In some embodiments, the support element 400 is coupled to the HMD module 100. A lower portion 402 of the support element 400 can be coupled to the frame 110 of the HMD module 100. In some embodiments, the support element 400 is only coupled to the HMD module 100 at the lower portion 402, allowing the support element 400 to be cantilevered from the HMD module 100.

In the depicted example, the upper portion 404 of the support element 400 extends from the lower portion 402. As illustrated, the upper portion 404 is a cantilevered member that is otherwise free of external support, such as a supplemental strap. The upper portion 404 of the support element 400 can engage the user's forehead 4 to allow the user's forehead 4 to support the head-mountable device 10.

Advantageously, by cantilevering the support element 400, the support element 400 can distribute or transfer forces between the support element 400 and the head-mountable device 10, and in turn, between a user's forehead 4 and the head-mountable device 10 allowing for increased user comfort without additional components such as a supplemental strap. As can be appreciated, the support element 400 can distribute or transfer forces between the user's forehead and the head-mountable device 10 without support from additional components such as a supplemental strap. As described herein, the support element 400 can be coupled to other portions of the head-mountable device 10 such as the light seal module 200, the arms 320, the strap 340, etc.

Figure 5:
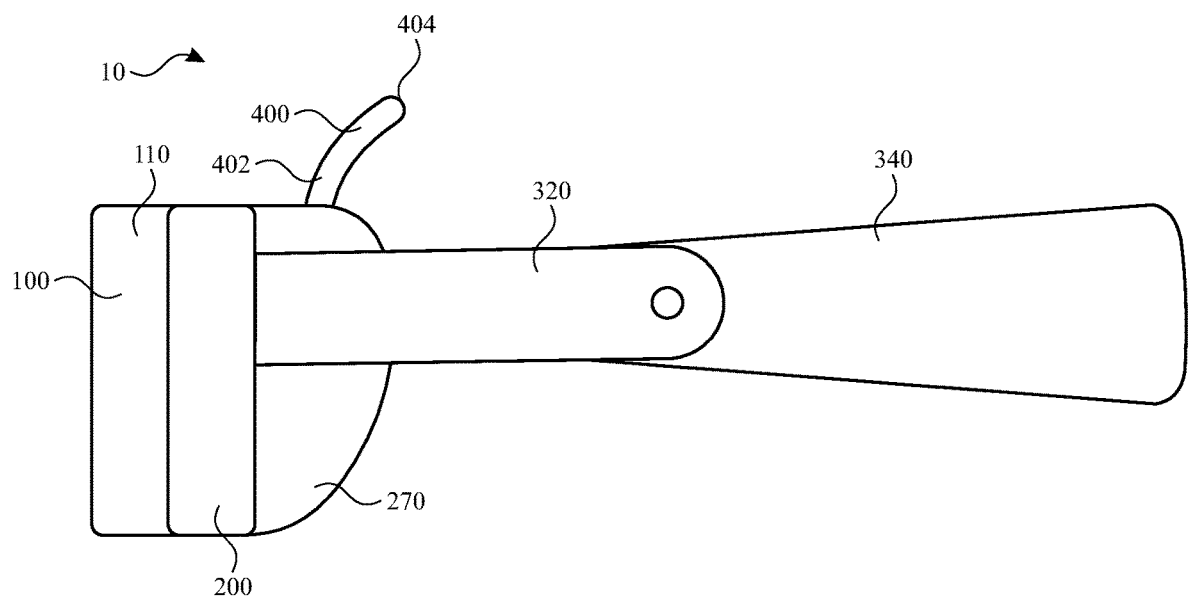
FIG. 5 illustrates a side view of a head-mountable device, according to some embodiments of the present disclosure

With reference to FIG. 5, the support element 400 can optionally extend from the light seal module 200. As illustrated, the lower portion 402 of the support element can be coupled to a portion of the light seal module 200.

By providing the support element 400 with the light seal module 200, both the light seal module 200 and the support element 400 can be provided as separate from the HMD module 100. As such, the light seal module 200 and the support element 400 can be provided with features that are customized, fitted, and/or sized for a particular user.

Figure 6:
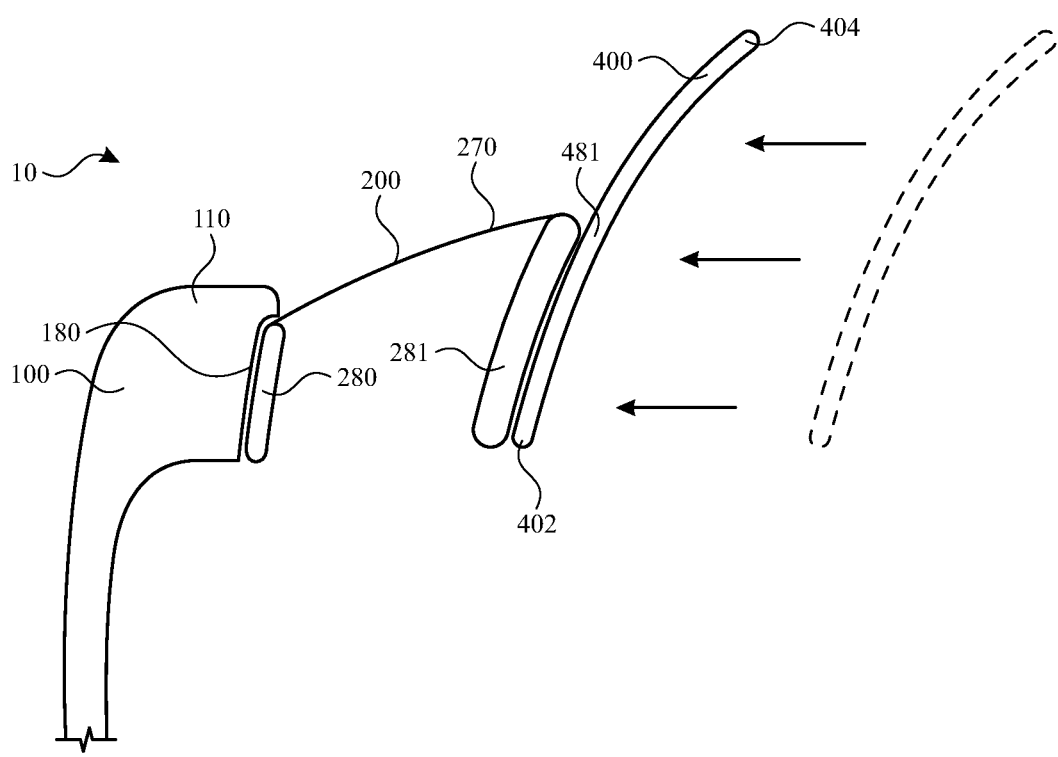
FIG. 6 illustrates an attachment mechanism of a head-mountable device, according to some embodiments of the present disclosure.

With reference to FIG. 6, the support element 400 can be removably attached to the head-mountable device 10. During operation, the support element 400 can be attached the head-mountable device 10 to increase comfort during periods of extended use. Further, the support element 400 can be removed from the head-mountable device 10 for shorter periods of use or to facilitate securement of the head-mountable device 10. Optionally, the support element 400 can be removed to reduce the weight of the head-mountable device 10, simplify the head-mountable device 10, and/or to modify the appearance of the head-mountable device 10.

In the depicted example, the support element 400 can be removably attached to the light seal module 200. An attachment element 481 of the support element 400 can attach or otherwise engage with attachment elements 281 of the light seal module 200. In some embodiments, the attachment element 481 can be located near the lower portion 402 of the support element 400. Optionally, the attachment elements 281 of the light seal module 200 are disposed at a near end of the cover 270.

One or more of various mechanisms can be provided to secure the light seal module 200 and the support element 400 to each other. For example, mechanisms such as locks, latches, snaps, screws, clasps, threads, magnets, pins, an interference (e.g., friction) fit, knurl presses, bayoneting, and/or combinations thereof can be included to couple and/or secure the light seal module 200 and the support element 400 together. The light seal module 200 and the support element 400 can remain secured to each other until an optional release mechanism is actuated. The release mechanism can be provided on an outer surface of the head-mountable device 10 for access by a user.

Figure 7:
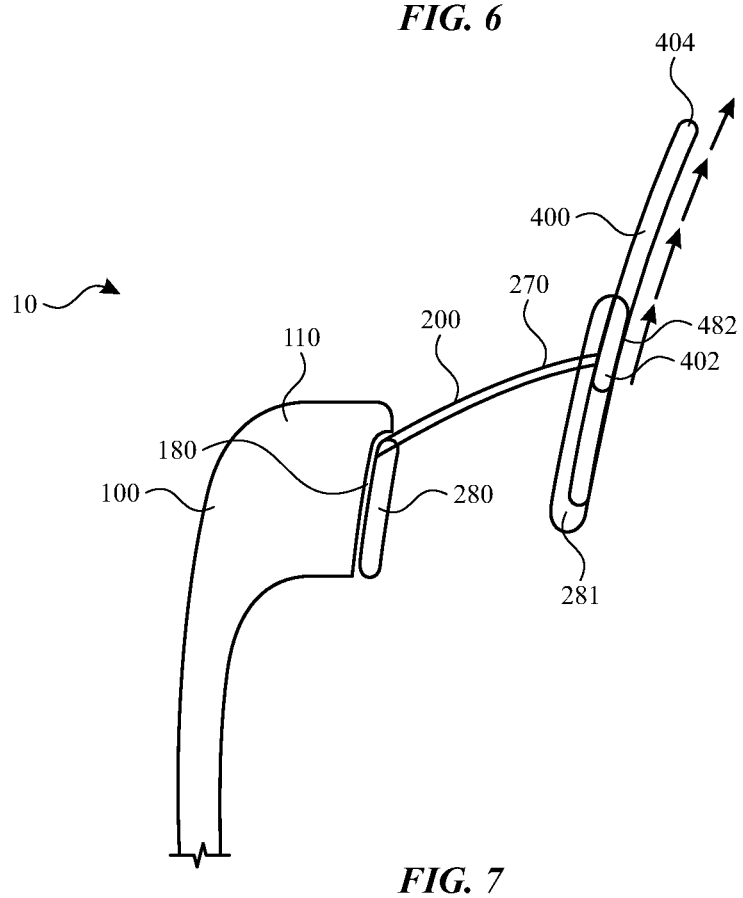
FIG. 7 illustrates an attachment mechanism of a head-mountable device, according to some embodiments of the present disclosure.
Figure 8:
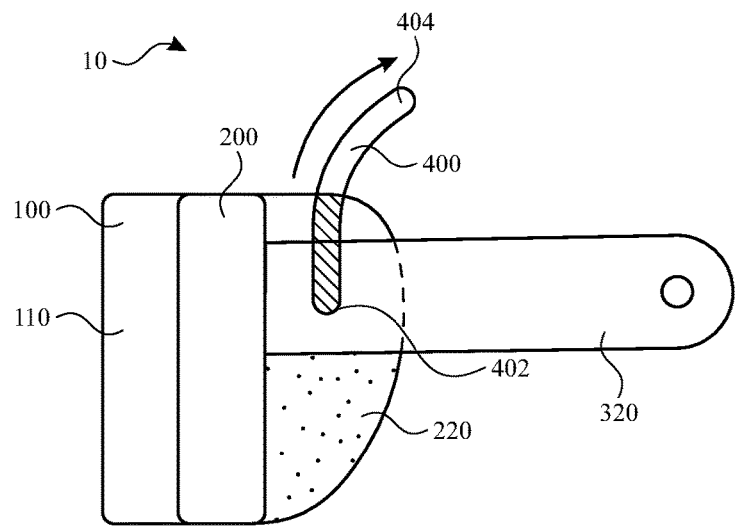
FIG. 8 illustrates a side view of a head-mountable device, according to some embodiments of the present disclosure.

With reference to FIGS. 7 and 8, the support element 400 can be deployable. Therefore, during operation, the support element 400 can be deployed to engage the user's head 2 to increase comfort during periods of extended use. Optionally, the support element 400 can be retracted for shorter periods of use.

In the depicted example, the support element 400 is in sliding engagement with the head-mountable device 10. For example, the support element 400 can be in sliding engagement with the light seal module 200. A sliding portion 482 of the support element 400 can be captured within an attachment element 281 of the light seal module 200. As shown in FIG. 7, the support element 400 can be attached to a far end of the cover 270. As shown in FIG. 8, the support element can be attached to a central portion of the cover 270.

During operation, the support element 400 can slide relative to the light seal module 200 to extend or retract the support element 400. As can be appreciated, the position of the support element 400 can be adjusted based on user preference, anatomy, and/or comfort.

Figure 9:
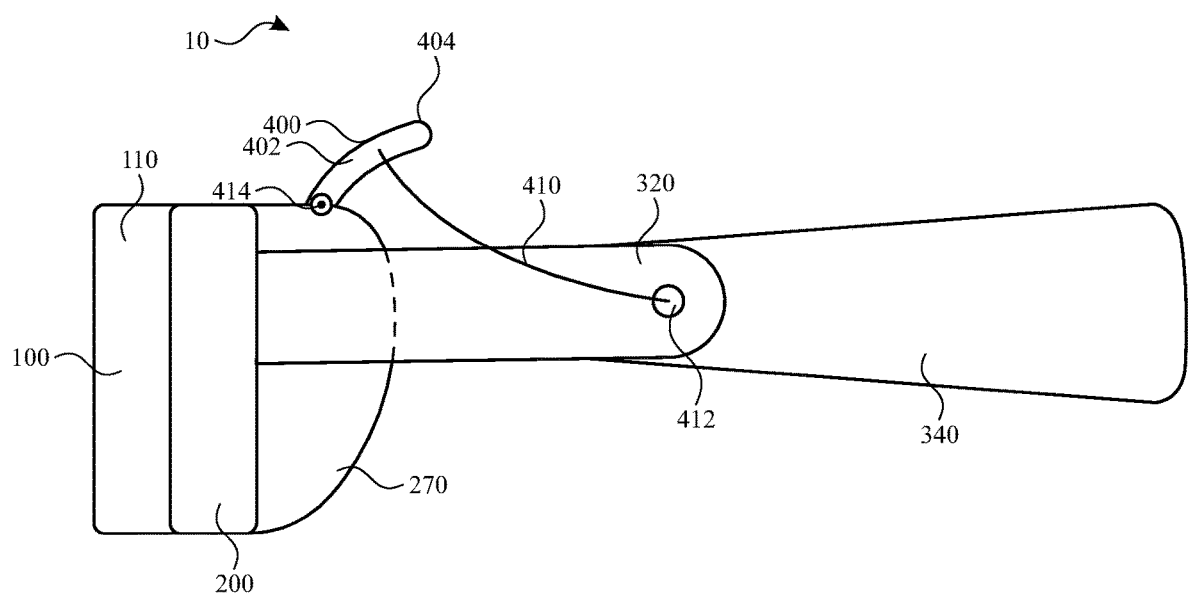
FIG. 9 illustrates a side view of a head-mountable device, according to some embodiments of the present disclosure.

Referring to FIG. 9, the support element 400 can rotate relative to the head-mountable device 10. Optionally, the support element 400 can rotate relative to the light seal module 200 to deploy and engage the user's head 2. As illustrated, the support element 400 can rotate via a pivot 414 coupling the lower portion 402 of the support element 400 to the cover 270 of the light seal module 200. In some embodiments, the support element 400 can be supported in a deployed position by a biasing member 410. The biasing member 410 can provide coupled to the arms 320 via an attachment point 412.

Figure 10:
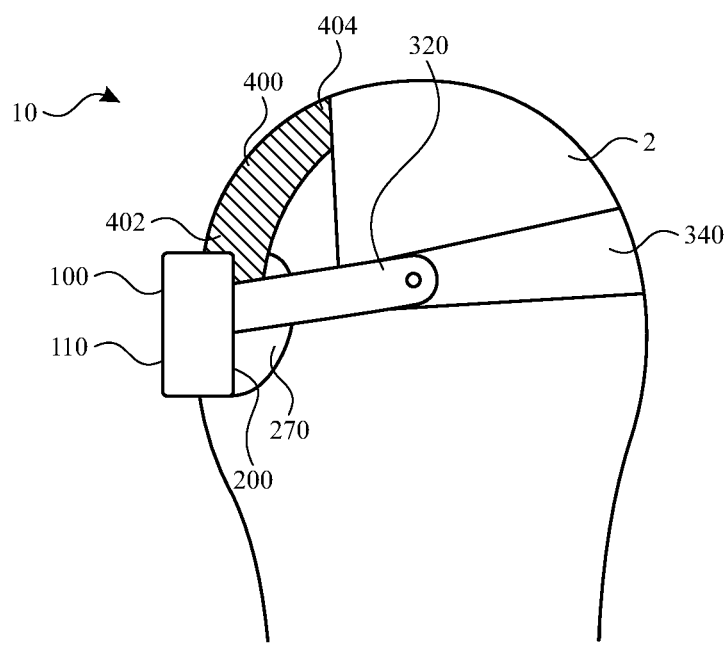
FIG. 10 illustrates a side view of a head-mountable device, according to some embodiments of the present disclosure.

With reference to FIG. 10, in some embodiments, the support element 400 can provide extended engagement of the user's forehead. As can be appreciated, the support element 400 can be configured to extend along the user's forehead toward an upper portion of the user's head. Further, the width of the support element 400 can be configured to provide greater cover of a user's forehead. Advantageously, the shape of the support element 400 can further distribute forces from the head-mountable device 10.

Figure 11:
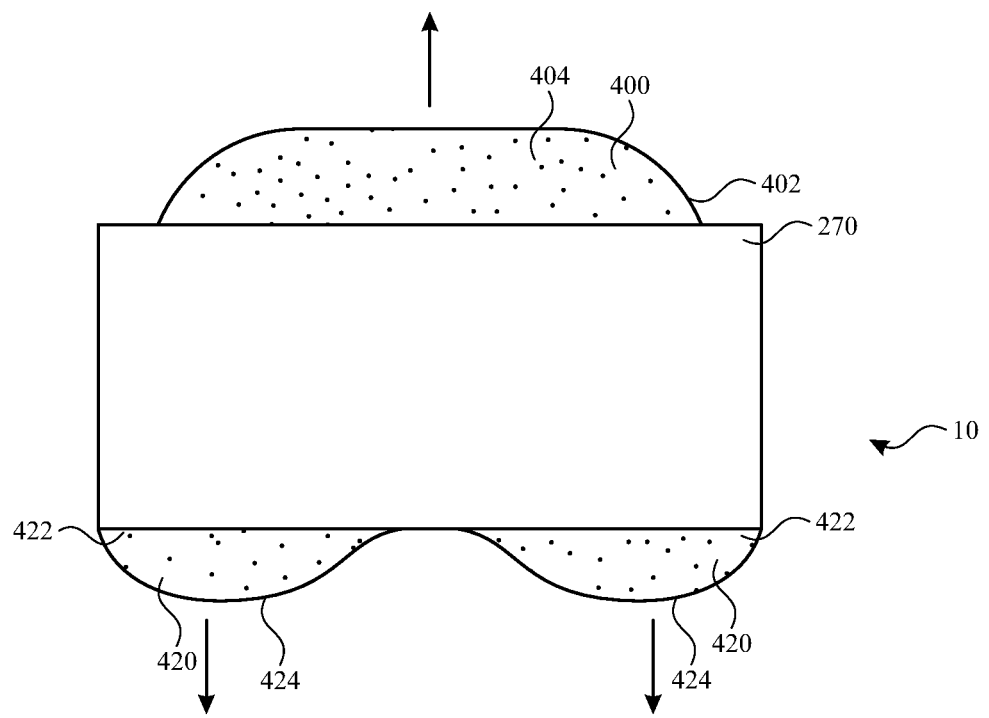
FIG. 11 illustrates a rear view of a head-mountable device, according to some embodiments of the present disclosure.

With reference to FIG. 11, the head-mountable device 10 can optionally include support elements that extend above and below the head-mountable device 10. As described herein, the head-mountable device 10 can include a support element 400 that extends upwardly to engage the user's forehead. Further, in some embodiments, the head-mountable device 10 can include support elements 420 that extend downward from the head-mountable device 10 to engage the user's cheeks and/or nose.

By engaging the user's cheeks and/or nose, the support elements 420 can distribute forces along a greater portion of the user's head 2, increasing comfort. The lower portions 424 of the support elements 420 can extend a desired distance from the HMD module 100. As can be appreciated, the support elements 420 can engage other features or regions of the users head 2.

In some embodiments, the support elements 420 are coupled to the HMD module 100. In some embodiments, the upper portion 422 of the support elements 420 can be coupled to the frame 110 of the HMD module 100. The upper portion 422 of the support elements 420 could also be coupled to the light seal module 200. In some embodiments, the support elements 400, 420 may be integrated with the components of the light seal module 200.

Figure 12:
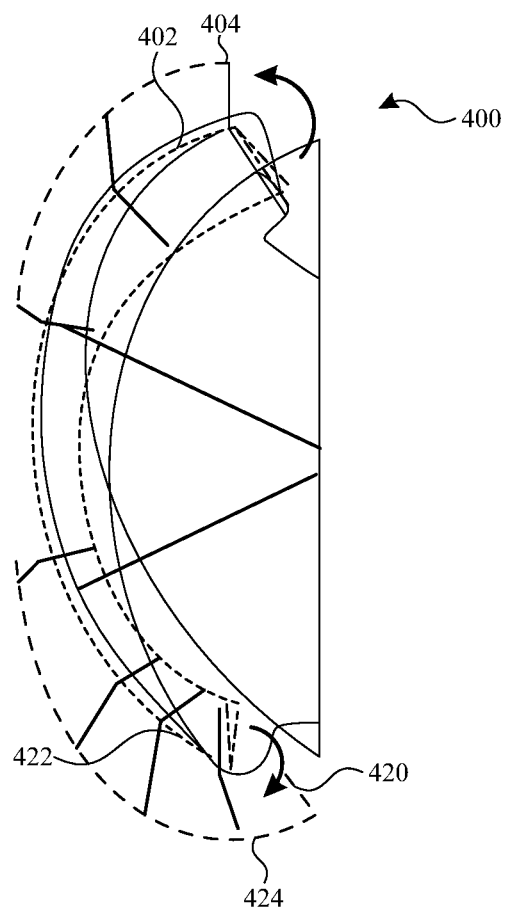
FIG. 12 illustrates a partial cross-sectional side view of a cover of a light seal module, according to some embodiments of the present disclosure.

With reference to FIG. 12, the support elements 400 and/or 420 can be deployed, unfurled, or unfolded to increase comfort during periods of extended use. Optionally, the support elements 400 and/or 420 can be retracted for shorter periods of use.

In the depicted example, the support elements 400 and/or 420 can be attached to the head-mountable device 10. For example, the lower portion 402 of the support element 400 can be coupled to portions of the head-mountable device 10 such as the HMD module 100 and/or the light seal module 200. The upper portion 404 can be moved relative to the lower portion 402 to unfurl or deploy the support element 400 for additional support or to fold the support element 400 for a compact configuration.

Similarly, the upper portion 422 of the support element 420 can be coupled to portions of the head-mountable device 10 such as the HMD module 100 and/or the light seal module 200. The lower portion 424 can be moved relative to the upper portion 422 to unfurl or deploy the support element 420 for additional support or to fold the support element 420 for a compact configuration.

During operation, the support elements 400 and 420 can be moved or unfurled to a generally perpendicular position relative to the HMD module 100 and/or the light seal module 200 to provide additional support during extended wear of the head-mountable device 10. As desired, the support elements 400 and 420 can be moved or folded to a generally parallel position relative to the HMD module 100 and/or the light seal module 200. In some embodiments, the position of the support elements 400 and 420 can be adjusted for user preference, anatomy, and/or comfort. Optionally, the support elements 400 and 420 can utilize shape-memory materials or other mechanisms to retain a desired position.

Figure 13:
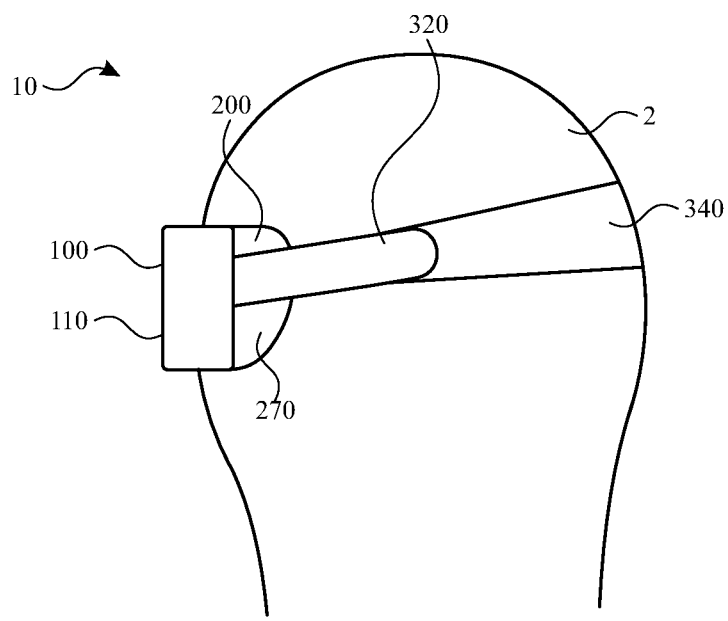
FIG. 13 illustrates a side view of a head-mountable device, according to some embodiments of the present disclosure.

With reference to FIG. 13, in some embodiments, the head-mountable device 10 can utilize low coefficient of friction materials to allow the HMD module 100 to move relative to a user's head 2, minimizing fatigue. In the depicted example, portions of the cover 270 of the light seal module 200 that contact the user's face can be formed from low coefficient of friction materials to allow the HMD module 100 and/or the light seal module 200 to move relative to the user's head 2 while being secured. Due to lower friction between the cover 270 and the user's face, the head-mountable device 10 may readily move to a position that distributes forces evenly to increase user comfort and/or to relieve discomfort.

Figure 14:
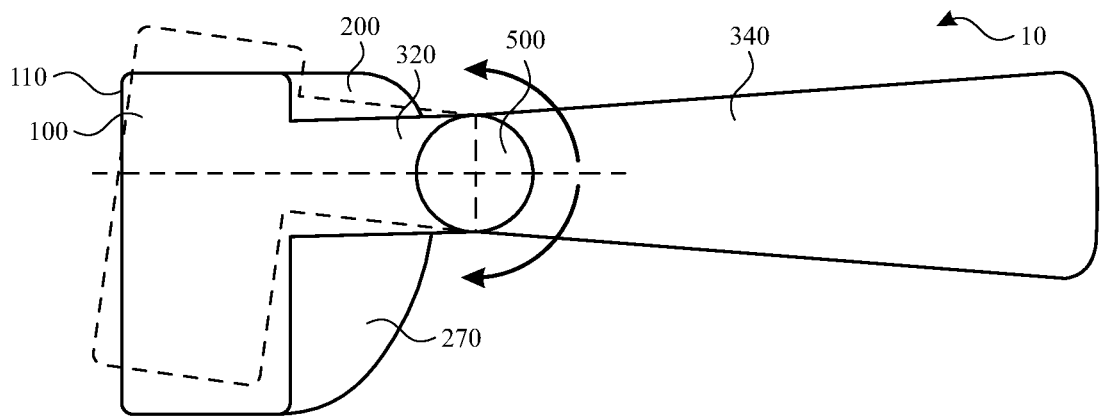
FIG. 14 illustrates a side view of a head-mountable device, according to some embodiments of the present disclosure.
Figure 15:
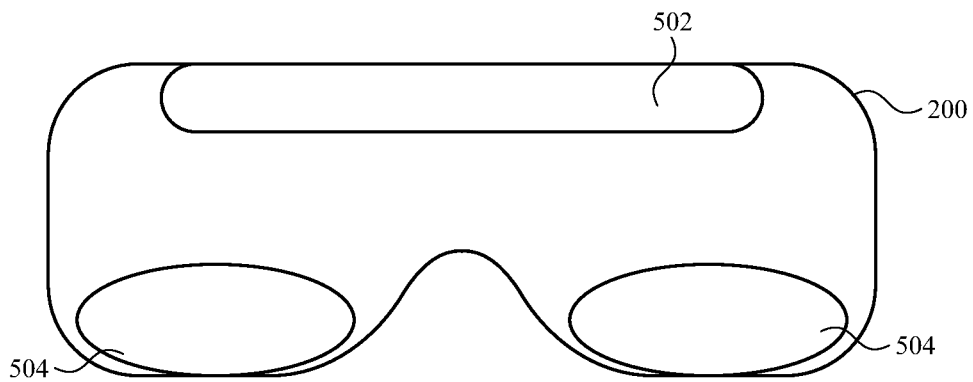
FIG. 15 illustrates a rear view of a head-mountable device of FIG. 14, according to some embodiments of the present disclosure.

With reference to FIGS. 14 and 15, the head-mountable device 10 can utilize a biasing element 500 to adjust the distribution of forces of the head-mountable device 10 along the user's face. The biasing element 500 can adjust the engagement of the head-mountable device 10 with the user's head 2 to adjust points of contact of the head-mountable device 10 with user's head 2. The biasing element 500 can allow different areas of the user's head 2 to carry different portions of the force of the head-mountable device 10.

In the depicted example, the biasing element 500 can distribute forces between a forehead engagement area 502 and cheek engagement areas 504. In some embodiments, the biasing element 500 can counter act the downward rotation of the HMD module 100 and adjust or equalize the force experienced by the forehead engagement area 502 and the cheek engagement areas 504. Optionally, the biasing element 500 can rotate the HMD module 100 upwards to relieve force on the cheek engagement areas 504 and apply force to the forehead engagement area 502.

Optionally, the distribution of forces can be moved or shifted over time. In some embodiments, forces can shift or alternate between the forehead engagement area 502 and the cheek engagement areas 504. The distribution of forces can be shifted to increase user comfort and to minimize fatigue.

The biasing element 500 can utilize a biasing member such as a spring to shift forces as desired. In some embodiments, the spring force can be adjustable to manipulate the distribution of forces. Optionally, the biasing element 500 can utilize electronic motors or actuators to adjust the distribution of forces. The biasing element 500 can be automated to shift the distribution of forces over time or based on activities of the head-mountable device 10.

During operation, the biasing element 500 can rotate the HMD module 100 relative to the strap 340. The biasing element 500 can pivotally couple the HMD module 100 to the strap 340. As illustrated, the biasing element 500 can couple to the arms 320 of the head-mountable device 10. As can be appreciated, the biasing element 500 can be disposed between the HMD module 100 and the light seal module 200 and/or between the light seal module 200 and the strap 340.

Figure 16:
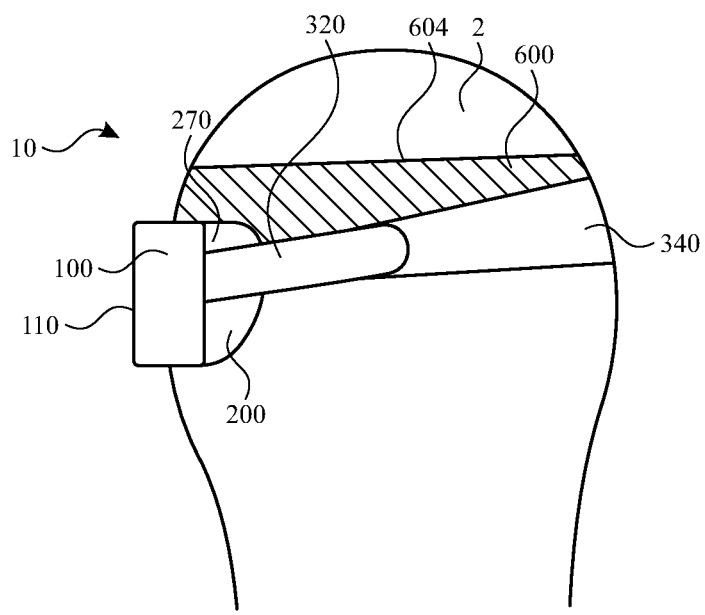
FIG. 16 illustrates a side view of a head-mountable device, according to some embodiments of the present disclosure.

With reference to FIG. 16, the strap 340 of the head-mountable device 10 can include a supplemental support portion 600 to increase user comfort. The support portion 600 can increase the effective surface area or otherwise provide additional surface area to the strap 340, decreasing pressure and distributing forces over a greater portion of the user's head 2.

As illustrated, an upper portion 604 of the support portion 600 can extend toward the top portion of the head 2 from the strap 340 to increase the contact area of the strap 340. In some embodiments, the upper portion 604 of the support portion 600 can extend vertically or otherwise axially along the direction of the central longitudinal axis defined by the user's head 2. For example, the upper portion 604 can extend to contact the region between the user's ears and the top or crown of the user's head 2. The support portion 600 can be woven, glued, ultrasonically welded, fastened, etc. to the strap 340 or other portions of the head-mountable device 10.

In some embodiments, the support portion 600 can be a fabric material. Optionally, the support portion 600 can be padded to increase user comfort. The support portion 600 can be rolled or folded when not in use to minimize the profile of the head-mountable device 10. In some embodiments, the support portion 600 is inflatable to increase surface area of engagement with the user's head 2.

Figure 17:
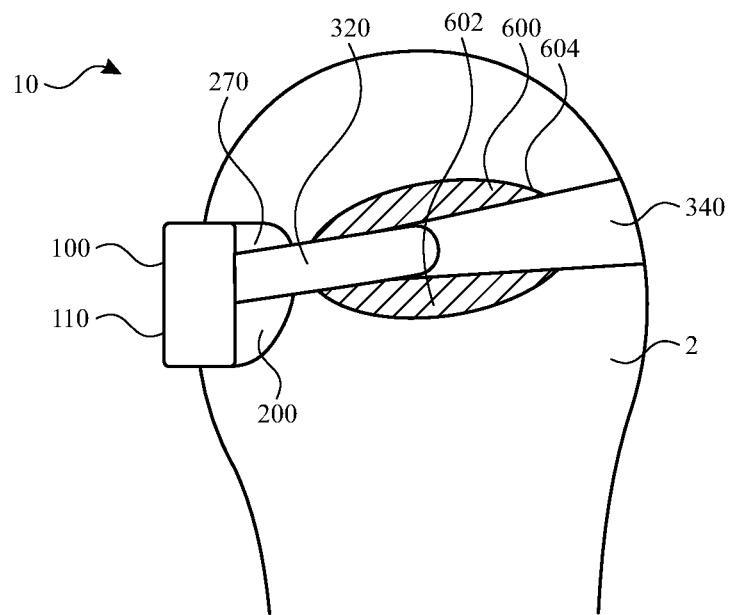
FIG. 17 illustrates a side view of a head-mountable device, according to some embodiments of the present disclosure.

With reference to FIG. 17, the support portion 600 can extend above and below the strap 340 to increase contact area of the strap 340. The support portion 600 can have a generally oval shape centered around the strap 340. Optionally, the lower portion 602 of the support portion 600 can rest against a user's ears, stabilizing the head-mountable device 10.

In some embodiments, the support portion 600 can be inflated to provide additional support or surface area during periods of extended wear. The support portion 600 can be inflated to expand or extend above and below the strap 340 based on a user's preferences and anatomy. In some embodiments, the support portion 600 can extend vertically or otherwise axially along the direction of the central longitudinal axis defined by the user's head 2. During operation, the support portion 600 can expand or extend to contact the region between the user's ears and the top or crown of the user's head 2. For example, an upper portion 604 of the support portion can extend or expand to contact the region above the strap 340 and below the top or crown of the user's head and the lower portion 602 can extend or expand to contact the region below the strap 340 and above the user's ears. For short term wear, the support portion 600 can be deflated or collapsed to reduce the profile of the strap 340. In some embodiments, the inflation and deflation of the support portion 600 can be automatic to adjust the distribution of forces upon the user. Inflation and deflation of the support portion 600 can further be adjusted based on the time of use as well as anticipated use of the head-mountable device 10.

With reference to FIGS. 18-24, the head-mountable device 10 can utilize one or more supplemental bands or straps that extend across the top, sides, and/or rear of the user's head 2 to increase comfort during use of the head-mountable device 10. As can be appreciated, the supplemental bands or straps can increase surface area, minimizing pressure, and allow for increased support of the head-mountable device 10.

Figure 18:
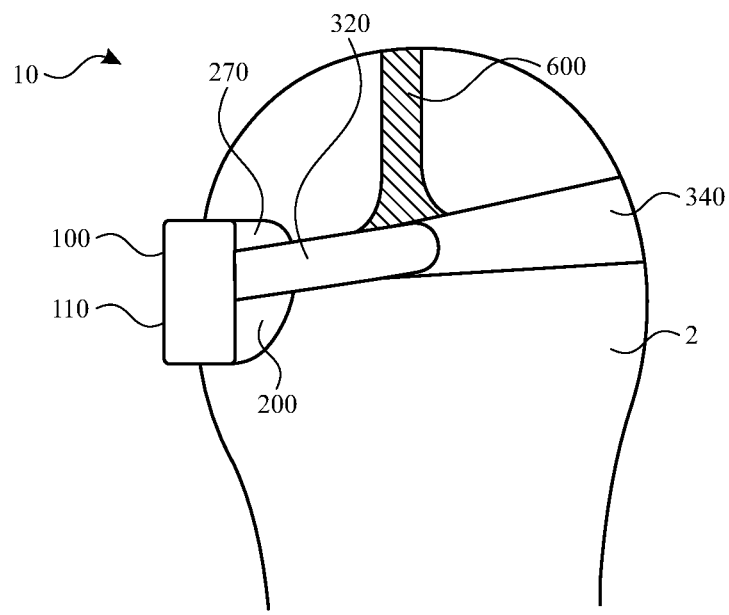
FIG. 18 illustrates a side view of a head-mountable device, according to some embodiments of the present disclosure.

For example, as shown in FIG. 18, the support portion 600 can include a supplemental band that extends over the top of the user's head 2. The support portion 600 can couple to opposing sides of the strap 340. It is understood that the support portion 600 can engage directly or indirectly with the indicated structures. As can be appreciated, the support portion 600 can engage or be coupled with the arms 320, HMD module 100 and/or the light seal module 200.

The various bands can include rigid portions and/or flexible portions to provide support and a comfortable fit on a user. For example, support portion 600 can include a rigid section that engages the head 2 of the user. By further example, the support portion 600 can include a flexible section that accommodates the head 2 of the user.

The support portion 600 can further include an adjustment element for adjusting a tightness and/or fit of the support portion 600. The adjustment element can, for example, be operated to alter a total length of the support portion 600. The adjustment element can be operated manually by a user and/or by a controller of the head-mountable device 10 (e.g., in the HMD module 100). Operation of the adjustment element can alter the fit of the support portion 600 as well as the clamping force of the support portion 600 on sides of the user's head 2.

Figure 19:
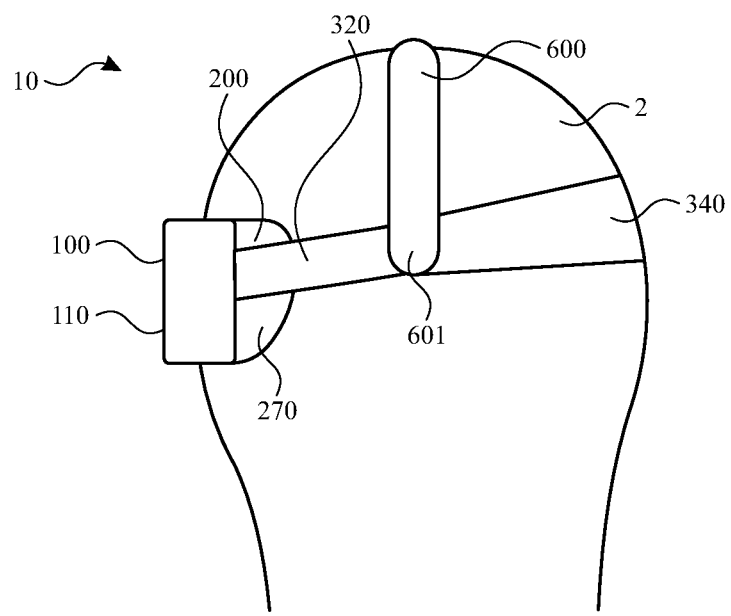
FIG. 19 illustrates a side view of a head-mountable device, according to some embodiments of the present disclosure.

As shown in FIG. 19, in some embodiments, the support portion 600 can be rotatable relative to the strap 340 to allow the support portion 600 to be deployed during extended wear and stowed during shorter periods of use. The support portion 600 can be pivotally or rotationally coupled to the strap 340 at a pivot or hinge 601 to allow the support portion 600 to rotate relative to the strap 340. In some embodiments, the support portion 600 extends from one side of the user's head 2 to the other side of the user's head 2, such that the support portion 600 rotates about a latitudinal axis of the user's head 2.

During operation, the support portion 600 can be rotated to a deployed position where the support portion 600 extends over the top of the user's head 2 for extended wear. For shorter periods of use, the support portion 600 can be rotated toward the back of the strap 340 or towards the HMD module 100 to stow the support portion 600.

Figure 20:
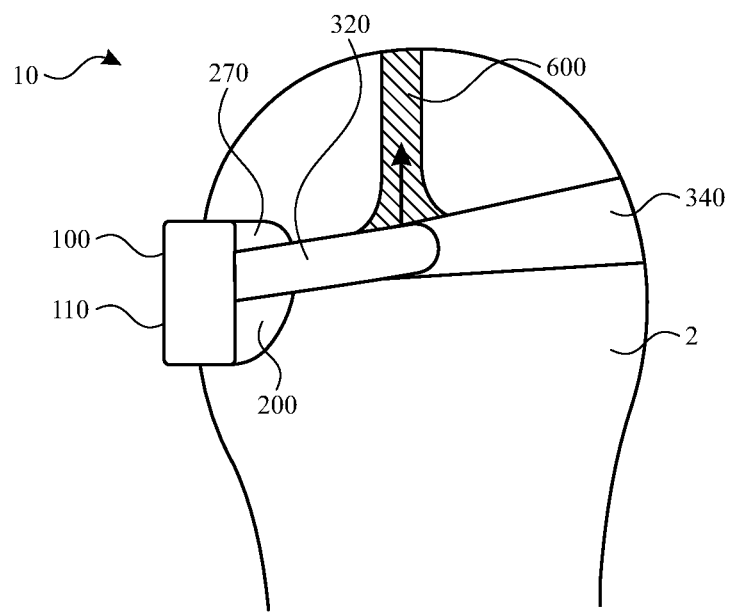
FIG. 20 illustrates a side view of a head-mountable device, according to some embodiments of the present disclosure.

As shown in FIG. 20, the supplemental band can be retractable to allow the support portion 600 to be utilized during extended wear and retracted for shorter periods of use. One or both sides of the support portion 600 can be releasably attached to the strap 340 to allow the support portion 600 to be retracted or removed from the strap 340. The support portion 600 can be wound onto a spool upon retraction. In some embodiments, the support portion 600 comprises a single supplemental band that extends over the user's head. Optionally, the support portion 600 comprises two supplemental bands that couple or attach over the user's head.

Figure 21:
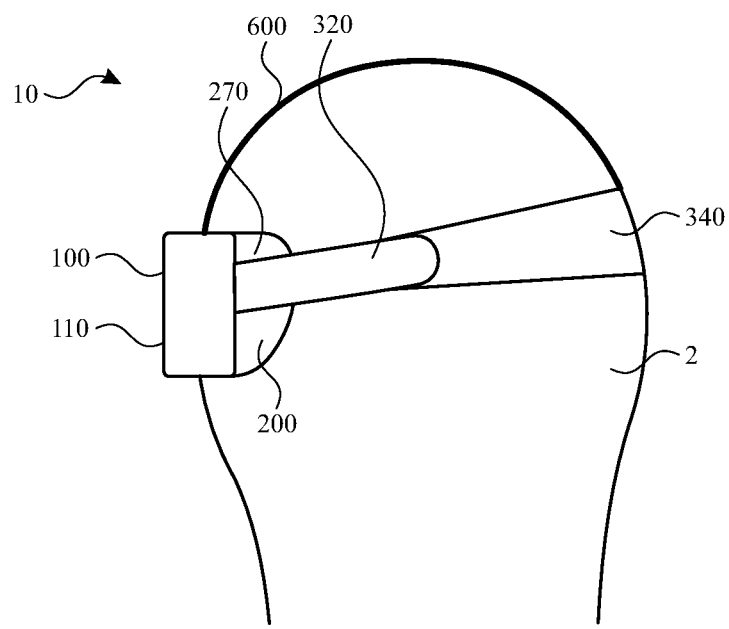
FIG. 21 illustrates a side view of a head-mountable device, according to some embodiments of the present disclosure.
Figure 22:
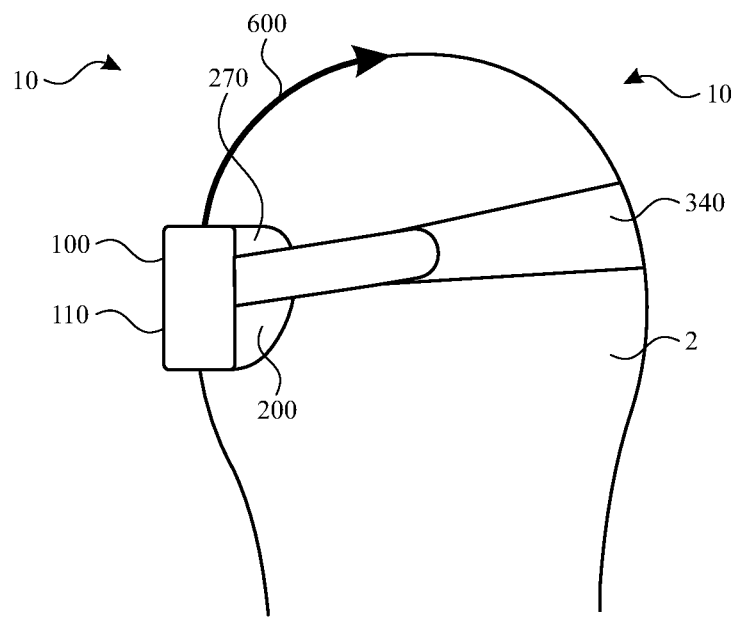
FIG. 22 illustrates a side view of a head-mountable device, according to some embodiments of the present disclosure.

In another example, as shown in FIG. 21, the support portion 600 can extend front-to-back to couple to the HMD module 100 and an opposing portion for the strap 340. is understood that the support portion 600 can engage directly or indirectly with the indicated structures. As can be appreciated, the support portion 600 can engage or be coupled with the arms 320, HMD module 100 and/or the light seal module 200. With reference to FIG. 22, the support portion of FIG. 21 may be retractable.

Figure 23:
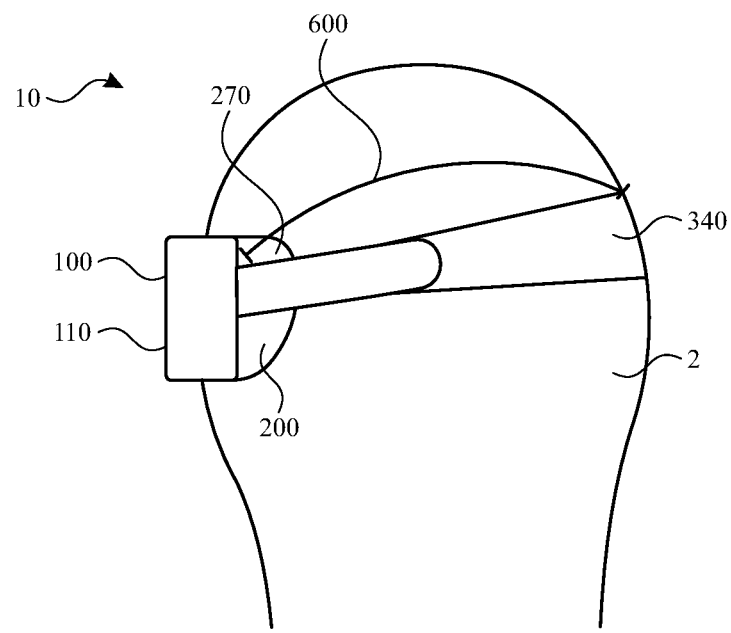
FIG. 23 illustrates a side view of a head-mountable device, according to some embodiments of the present disclosure.

As shown in FIG. 23, the head-mountable device 10 can include support portions 600 that extend along the side of the user's head 2. The support portions 600 can attach to the HMD module 100 and extend to a rear portion of the strap 340. In some embodiments, the support portions 600 can attach to the light seal module 200 and extend to a rear portion of the strap 340.

In some applications, the support portions 600 can be formed from a resilient or biasing material to allow the distribution of forces of the head-mountable device 10 along the user's face. Similar to the biasing element 500, the support portions 600 can adjust the engagement of the head-mountable device 10 with the user's head 2 to adjust points of contact of the head-mountable device 10 with user's head 2. The support portions 600 can allow different areas of the user's head 2 to carry different portions of the force of the head-mountable device 10.

In the depicted example, the support portions 600 can distribute forces between the forehead area and the cheek area of the user. In some embodiments, the support portions 600 can counter act the downward rotation of the HMD module 100 and adjust or equalize the force experienced by the forehead area and the cheek areas. Optionally, the support portions 600 can rotate the HMD module 100 upwards to relieve force on the cheek areas and apply force to the forehead area.

Figure 24:
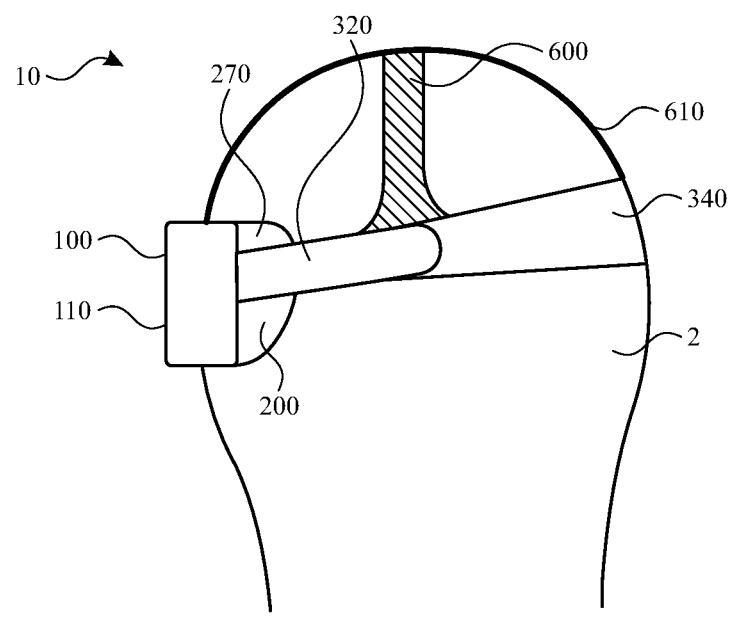
FIG. 24 illustrates a side view of a head-mountable device, according to some embodiments of the present disclosure.

As illustrated, in FIG. 24, the head-mountable device 10 can be supported by multiple support bands. As described with respect to FIG. 18, the support portion 600 can include a supplemental band coupled to opposing sides of the strap 340 that extends over the top of the user's head 2. Further, as described with respect to FIG. 21, the support portion 610 can extend front-to-back to couple to the HMD module 100 and an opposing portion for the strap 340. In some embodiments, the support portion 600 and 610 can be coupled together at the point of intersection to increase rigidity.

Figure 25:
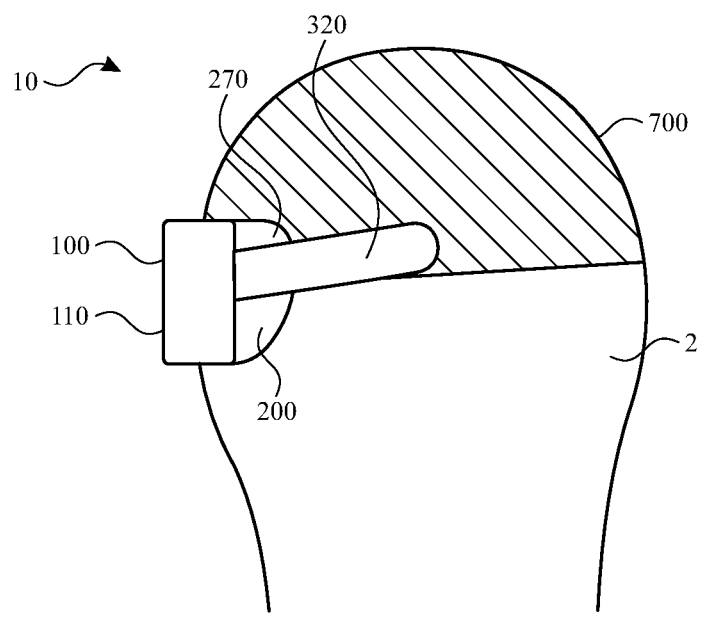
FIG. 25 illustrates a side view of a head-mountable device, according to some embodiments of the present disclosure.

Optionally, as illustrated in FIG. 25, the head-mountable device 10 can be supported by a cap element 700. In the depicted example, the HMD module 100 is coupled to a cap element 700. The HMD module 100 may be modularly attached to the cap element 700.

The cap element 700 can allow for greater contact with the user's head 2, reducing pressure and increasing comfort for extended periods of time. As illustrated, the cap element 700 can have a generally spherical construction to fit over a portion of the user's head 2. In some applications, the cap element 700 can be worn over the top portion of the user's head 2. The cap element 700 can have a continuous construction free of holes or interruptions to increase surface area in contact with the user's head.

In some embodiments, the cap element 700 can have a fabric construction. Optionally, the cap element 700 can have an integrated frame to support the HMD module 100.

Optionally, the cap element 700 can have a rigid construction, similar to a helmet. Advantageously, the cap element 700 can allow for increased audio isolation and performance, increased light sealing, and increased user privacy. In some applications, the cap element 700 can allow for additional sensor attachments.

Figure 26:
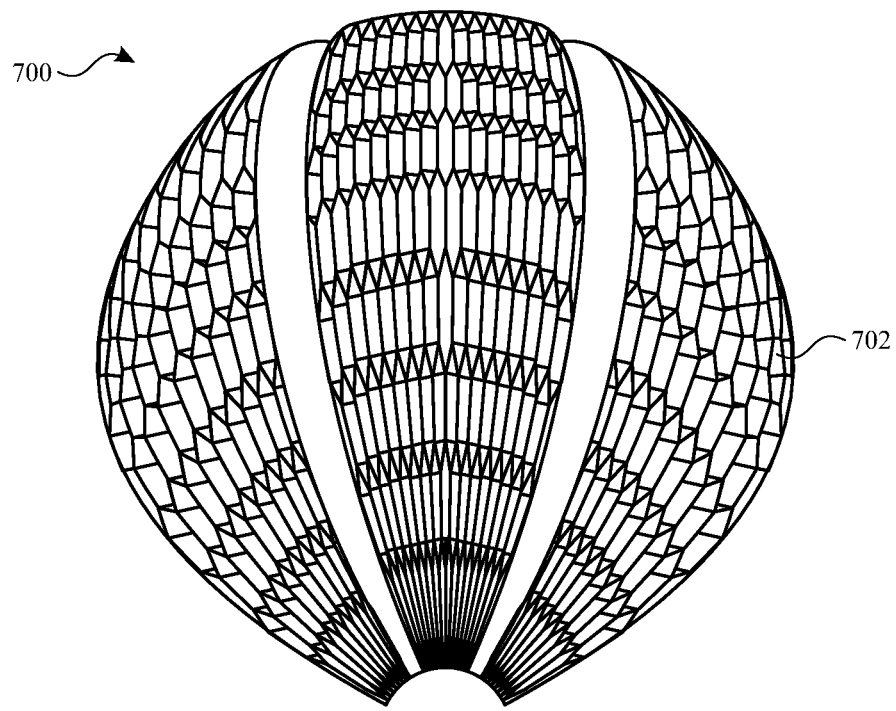
FIG. 26 illustrates a perspective view of a head-mountable device, according to some embodiments of the present disclosure.

With reference to FIG. 26, the cap element 700 may be collapsible. In some applications, the cap element 700 can be collapsed when not in use, allowing for storage or transportation. The cap element 700 can have a cell-like construction, allowing cells 702 to collapse by folding the structure of the cap element 700. As can be appreciated, while the cap element 700 can collapse in a circumferential direction, the cap element 700 may remain rigid in a radial direction.

Figure 27:
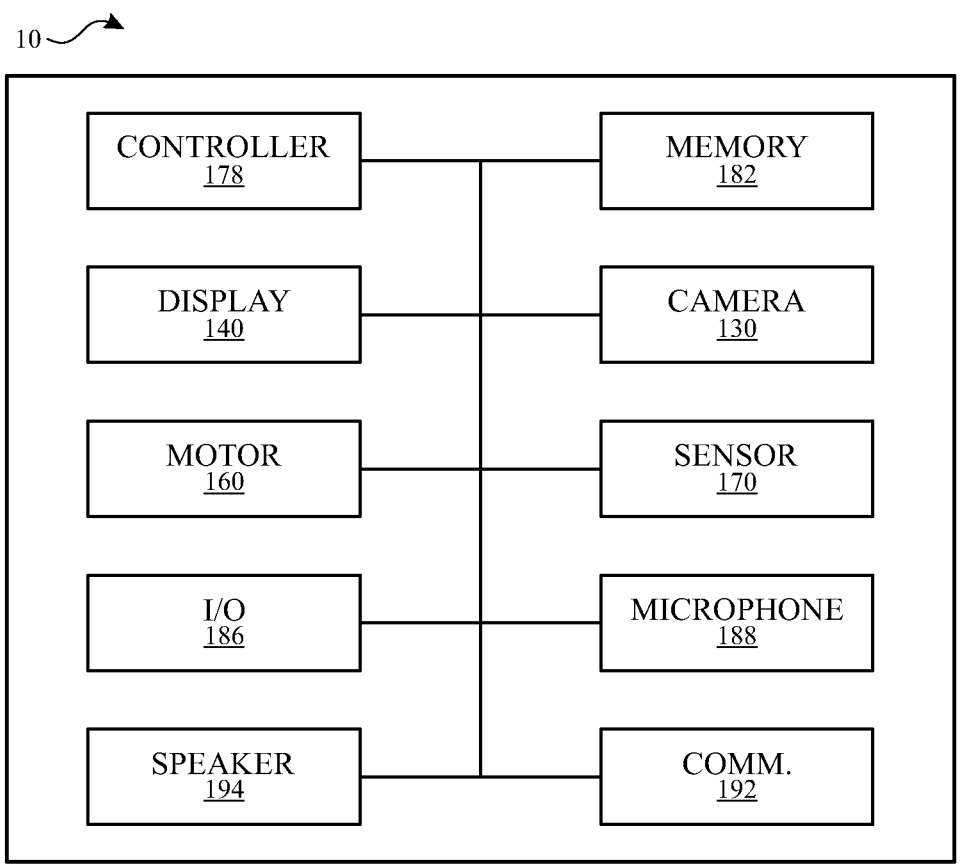
FIG. 27 illustrates a block diagram of a head-mountable device, in accordance with some embodiments of the present disclosure.

Referring now to FIG. 27, components of the head-mountable device can be operably connected to provide the performance described herein. FIG. 27 shows a simplified block diagram of an illustrative head-mountable device 10 in accordance with one embodiment of the invention. It will be appreciated that components described herein can be provided on one, some, or all of an HMD module, a light seal module, a nosepiece, and/or a support element. It will be understood that additional components, different components, or fewer components than those illustrated may be utilized within the scope of the subject disclosure.

As shown in FIG. 27, the head-mountable device 10 can include a controller 178 (e.g., control circuitry) with one or more processing units that include or are configured to access a memory 182 having instructions stored thereon. The instructions or computer programs may be configured to perform one or more of the operations or functions described with respect to the head-mountable device 10. The controller 178 can be implemented as any electronic device capable of processing, receiving, or transmitting data or instructions. For example, the controller 178 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

The memory 182 can store electronic data that can be used by the head-mountable device 10. For example, the memory 182 can store electrical data or content such as, for example, audio and video files, documents and applications, device settings and user preferences, timing and control signals or data for the various modules, data structures or databases, and so on. The memory 182 can be configured as any type of memory. By way of example only, the memory 182 can be implemented as random access memory, read-only memory, Flash memory, removable memory, or other types of storage elements, or combinations of such devices.

The head-mountable device 10 can further include a display element 140 for displaying visual information for a user. The display element 140 can provide visual (e.g., image or video) output. The display element 140 can be or include an opaque, transparent, and/or translucent display. The display element 140 may have a transparent or translucent medium through which light representative of images is directed to a user's eyes. The display element 140 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. The head-mountable device 10 can include an optical subassembly configured to help optically adjust and correctly project the image-based content being displayed by the display element 140 for close up viewing. The optical subassembly can include one or more lenses, mirrors, or other optical devices.

The head-mountable device 10 can include adjustment control components described herein, such as a motor 160, an actuator, and the like for moving components to a desired relative position and/or orientation.

The head-mountable device 10 can include one or more sensors 170, as described herein. The head-mountable device 10 can include one or more other sensors. Such sensors can be configured to sense substantially any type of characteristic such as, but not limited to, images, pressure, light, touch, force, temperature, position, motion, and so on. For example, the sensor can be a photodetector, a temperature sensor, a light or optical sensor, an atmospheric pressure sensor, a humidity sensor, a magnet, a gyroscope, an accelerometer, a chemical sensor, an ozone sensor, a particulate count sensor, and so on. By further example, the sensor can be a bio-sensor for tracking biometric characteristics, such as health and activity metrics. Other user sensors can perform facial feature detection, facial movement detection, facial recognition, eye tracking, user mood detection, user emotion detection, voice detection, etc. Sensors can include a camera which can capture image based content of the outside world.

The head-mountable device 10 can include an input/output component 186, which can include any suitable component for connecting head-mountable device 10 to other devices. Suitable components can include, for example, audio/video jacks, data connectors, or any additional or alternative input/output components. The input/output component 186 can include buttons, keys, or another feature that can act as a keyboard for operation by the user.

The head-mountable device 10 can include the microphone 188 as described herein. The microphone 188 can be operably connected to the controller 178 for detection of sound levels and communication of detections for further processing, as described further herein.

The head-mountable device 10 can include the speakers 190 as described herein. The speakers 194 can be operably connected to the controller 178 for control of speaker output, including sound levels, as described further herein.

The head-mountable device 10 can include communications circuitry 192 for communicating with one or more servers or other devices using any suitable communications protocol. For example, communications circuitry 192 can support Wi-Fi (e.g., a 802.11 protocol), Ethernet, Bluetooth, high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. Communications circuitry 192 can also include an antenna for transmitting and receiving electromagnetic signals.

The head-mountable device 10 can include a battery, which can charge and/or power components of the head-mountable device 10. The battery can also charge and/or power components connected to the head-mountable device 10.

Accordingly, embodiments of the present disclosure provide a head-mountable device that reaction forces along the user's head. A head-mountable device can include head securement element with a support element to engage the head of the user. The support element can be coupled to the frame or light seal module of the head-mountable device. The support element can be attachable or deployable from the head-mountable device. A head-mountable device can also distribute forces with a support portion extending from a band.

Various examples of aspects of the disclosure are described below as clauses for convenience. These are provided as examples, and do not limit the subject technology.

Clause A: a head-mountable device comprising: a frame; a display element supported by the frame; and a head securement element comprising: a band having ends coupled to the frame, the band being configured to extend around a head of a user; and cantilevered support element extending along an upper portion of the frame, the cantilevered support element having a first end coupled to the upper portion of the frame and a second free end extending upwardly away from the frame.

Clause B: a head-mountable device comprising: a frame; a display element supported by the frame; and a head securement element comprising: a strap having a first end and second end coupled to the frame, the strap having a first surface area to engage a head of a user; and deployable support portion coupled to the strap, the support portion configured to extend from the strap upon deployment to provide an additional surface area to engage the head of the user.

Clause C: a head-mountable device comprising: an HMD module comprising: a frame; and a display element supported by the frame; a light seal module coupled to the HMD module, the light seal module configured to conform to a face of a user and support the head-mountable device; and a head securement element comprising: a band having ends coupled to the frame, the band being adjustable to adjust a tightness of the band around a head of the user; and a support element having a first end coupled to the frame and a second end configured to extend away from the frame and engage a forehead of the user, wherein the support element is configured to engage the forehead of the user to support the frame.

One or more of the above clauses can include one or more of the features described below. It is noted that any of the following clauses may be combined in any combination with each other, and placed into a respective independent clause, e.g., clause A, B, or C.

Clause 1: the frame and the display element are components of an HMD module, the HMD module further comprising an HMD module attachment element on an inner side of the frame; and the head-mountable device further comprises a light seal module, the light seal module further comprising: a chassis having an outer side and an inner side; a cover extending about the chassis; and a light seal module attachment element on the outer side of the chassis, the light seal module attachment element being configured to engage the HMD module attachment element.

Clause 2: the support element is coupled to the frame by the light seal module.

Clause 3: the support element extends from the cover of the light seal module.

Clause 4: the support element is deployable to extend from the cover of the light seal module.

Clause 5: the support element comprises a material having a low coefficient of friction.

Clause 6: the first end of the support element is removably attachable to the frame.

Clause 7: the first end of the support element is magnetically attachable to the frame.

Clause 8: the support element is deployable to extend from the frame.

Clause 9: the support portion is configured to extend axially from the strap.

Clause 10: the support portion is inflatable to expand axially from the strap.

Clause 11: the support portion comprises a support band extending from a first portion of the strap to a second portion of the strap around the head of the user.

Clause 12: the support band is retractable.

Clause 13: the support band comprises a secondary support band extending from a third portion of the strap to a fourth portion of the strap around the head of the user.

Clause 14: the support portion comprises a biasing member coupled to the frame, the biasing member providing a biasing force to move the frame relative to the strap.

As described above, one aspect of the present technology may include the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A head-mountable device comprising:
   a frame;
   a display element supported by the frame;
   a light seal module coupled to the frame and configured to conform to a face;
   a head securement element configured to extend along opposing sides of a head to support the frame on the head, the head securement element comprising:
      arms extending from opposing sides of the frame; and
      a strap extending from ends of the arms; and
   a support portion configured to extend toward a top portion of the head, the support portion being coupled to opposing sides of the head securement element at respective distances away from the frame and the light seal module.

2. The head-mountable device of claim 1, further comprising:
   a camera supported by the frame;
   a speaker supported by the frame;
   a microphone supported by the frame; and
   a sensor supported by the frame.

3. The head-mountable device of claim 1, wherein:
   each of the arms comprises a substantially rigid structure; and
   the strap is stretchable.

4. The head-mountable device of claim 1, wherein the support portion is coupled to each of the arms.

5. The head-mountable device of claim 1, wherein the support portion is coupled to opposing sides of the strap.

6. The head-mountable device of claim 1, wherein each of opposing ends of the support portion is coupled to a region between the strap and a corresponding one of the arms.

7. The head-mountable device of claim 1, wherein the support portion comprises a rigid section for engaging the head.

8. The head-mountable device of claim 1, wherein the support portion comprises a flexible section for accommodating the head.

9. A head-mountable device comprising:
   a frame;
   a display element supported by the frame;
   a light seal module coupled to the frame and configured to conform to a face;
   a head securement element configured to extend along opposing sides of a head to support the frame on the head, the head securement element comprising:
      arms extending from opposing sides of the frame; and
      a strap extending from ends of the arms; and
   a support portion configured to extend toward a top portion of the head, the support portion extending from and being rotatable relative to the head securement element.

10. The head-mountable device of claim 9, further comprising a hinge configured to allow the support portion to rotate relative to the strap.

11. The head-mountable device of claim 9, wherein the support portion is configured to be rotated between:
   a deployed position where the support portion extends over a top of the head; and
   a stowed position where the support portion extends toward a back of the strap.

12. The head-mountable device of claim 9, wherein each of opposing ends of the support portion is coupled to a region between the strap and a corresponding one of the arms.

13. The head-mountable device of claim 9, wherein at least one side of the support portion is configured to be releasably attached to the strap to allow the support portion to be retracted from the strap.

14. The head-mountable device of claim 13, wherein, upon retraction, the support portion is configured to be wound onto a spool.

15. The head-mountable device of claim 13, wherein the support portion comprises two supplemental bands that attach over the head.

16. A head-mountable device comprising:

a frame;

a display element supported by the frame;

a light seal module coupled to the frame and configured to conform to a face;

a head securement element configured to extend along opposing sides of a head to support the frame on the head, the head securement element comprising:

arms extending from opposing sides of the frame; and a strap extending from ends of the arms; and a support portion coupled to opposing sides of the head securement element, the support portion comprising an adjustment element for adjusting a tightness of the support portion.

17. The head-mountable device of claim 16, wherein the adjustment element is configured to be operated to alter a total length of the support portion.

18. The head-mountable device of claim 17, wherein the adjustment element is configured to be operated manually.

19. The head-mountable device of claim 17, further comprising a controller configured to operate the adjustment element to alter the total length of the support portion.

20. The head-mountable device of claim 16, wherein:

each of opposing ends of the support portion is coupled to a region between the strap and a corresponding one of the arms; and the support portion is rotatable relative to the head securement element.

* * * * *